(12) United States Patent
Oron et al.

(10) Patent No.: US 9,489,720 B2
(45) Date of Patent: Nov. 8, 2016

(54) NON-LOCAL MEANS IMAGE DENOISING WITH DETAIL PRESERVATION USING SELF-SIMILARITY DRIVEN BLENDING

(71) Applicant: Intel Corporation, Santa Clara, CA (US)

(72) Inventors: Shaul Oron, Petach-Tikva (IL); Gilad Michael, Tzur Yizhak (IL)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 14/494,163

(22) Filed: Sep. 23, 2014

(65) Prior Publication Data

US 2016/0086317 A1    Mar. 24, 2016

(51) Int. Cl.
  *G06T 5/00*   (2006.01)
  *G06T 7/40*   (2006.01)
  *G06T 5/20*   (2006.01)

(52) U.S. Cl.
  CPC ............. *G06T 5/002* (2013.01); *G06T 5/20* (2013.01); *G06T 7/40* (2013.01)

(58) Field of Classification Search
  None
  See application file for complete search history.

(56) References Cited

U.S. PATENT DOCUMENTS

| 7,171,057 B1* | 1/2007 | Wilensky | G06T 15/503 345/629 |
|---|---|---|---|
| 2011/0142368 A1 | 6/2011 | Shin et al. | |
| 2014/0064615 A1 | 3/2014 | Ren et al. | |
| 2014/0139706 A1 | 5/2014 | Jang et al. | |
| 2014/0226905 A1 | 8/2014 | Yahata et al. | |

FOREIGN PATENT DOCUMENTS

KR   10-2014-0066017 A   5/2014

OTHER PUBLICATIONS

Mairal, Julien, et al. "Non-local sparse models for image restoration." Computer Vision, 2009 IEEE 12th International Conference on. IEEE, 2009.*

(Continued)

*Primary Examiner* — Bhavesh Mehta
*Assistant Examiner* — Menatoallah Youssef
(74) *Attorney, Agent, or Firm* — Green, Howard & Mughal, LLP

(57) ABSTRACT

System, apparatus, method, and computer readable media for texture enhanced non-local means (NLM) image denoising. In embodiments, detail is preserved in filtered image data through a blending between the noisy input target pixel value and the NLM pixel value that is driven by self-similarity and further informed by an independent measure of local texture. In embodiments, the blending is driven by one or more blending weight or coefficient that is indicative of texture so that the level of detail preserved by the enhanced noise reduction filter scales with the amount of texture. Embodiments herein may thereby denoise regions of an image that lack significant texture (i.e. are smooth) more aggressively than more highly textured regions. In further embodiments, the blending coefficient is further determined based on similarity scores of candidate patches with the number of those scores considered being based on the texture score.

23 Claims, 7 Drawing Sheets

(56) References Cited

OTHER PUBLICATIONS

International Search Report and Written Opinion for International Patent Application No. PCT/US2015/044735, mailed on Nov. 30, 2015, 10 pages.

Buades, A., et al., "A non-local algorithm for image denoising," IEEE Computer Society Conference on Computer Vision and Pattern Recognition, vol. 2, pp. 60-65.

Dahl, A., et al., "Texture Segmentation by Contractive Decomposition and Planar Grouping," Proceedings of the 7th IAPR-TC-15 International Workshop on Graph-Based Representations in Pattern Recognition, 2009, pp. 343-352.

Todorovic, S., et al., "Texel-based Texture Segmentation", Proceedings of IEEE International Conference on Computer Vision (ICCV), Kyoto, Japan, 2009. 8 pages.

Buades, A., et al., "On image denoising methods," Technical Report, CMLA, 2004, 40 pages.

Salmon, J., et al., "From patches to pixels in non-local methods: weighted-average reprojection," 17th IEEE International Conference on Image Processing (ICIP), 2010, pp. 1929-1932.

* cited by examiner

NON-LOCAL MEANS IMAGE DENOISING WITH DETAIL PRESERVATION USING SELF-SIMILARITY DRIVEN BLENDING

BACKGROUND

Image denoising is an important functional block in an image-processing pipeline. The goal of image denoising methods is to recover the original image from a noisy measurement. Images generated by digital camera sensors pick up noise from a variety of sources, which should be reduced for aesthetic or practical (e.g., machine vision) purposes. Ideally, a noise reduction algorithm utilized by an image denoising block should improve image clarity by reducing noise while minimizing loss of real detail. The technical difficulty lies in robustly distinguishing noise from image details.

Many image denoising algorithms that perform some averaging or weighting of a pixel relative to a grouping of pixels spatially surrounding the target pixel are referred to as "local mean" or "local smoothing" filters. Non-local image denoising algorithms, the most prevalent of which is the non-local means (NLM) algorithm, have gained popularity in the last decade because relative to many local mean algorithms post-filtering clarity is improved while the real detail loss is reduced. An NLM filter utilizes redundancy within an image to reduce edge blurring by taking a mean of a greater number of pixels in the image, weighted by how similar the pixels are to the target pixel. More specifically, for each input pixel, a target patch containing the target pixel is determined. Other candidate patches in a neighborhood of the target patch are then assessed for similarity. An average pixel patch is computed as a weighted average of the candidate patches according to the "self-similarity" weight assigned to the candidate patch. The averaged pixel patch is then taken directly as the filtered target pixel output of the NML filter.

While the NLM denoising technique is considered to improve image quality over most local mean filters, the NLM technique favors highly periodic images. Quality loss is predominantly aperiodic detail, with the visual perception being a blurring that affects high-frequency texture regions and unique pixels. Image denoising techniques and hardware architectures capable of improving image clarity while preserving desirable texture and high frequency detail to a greater extent than possible with existing NLM techniques are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
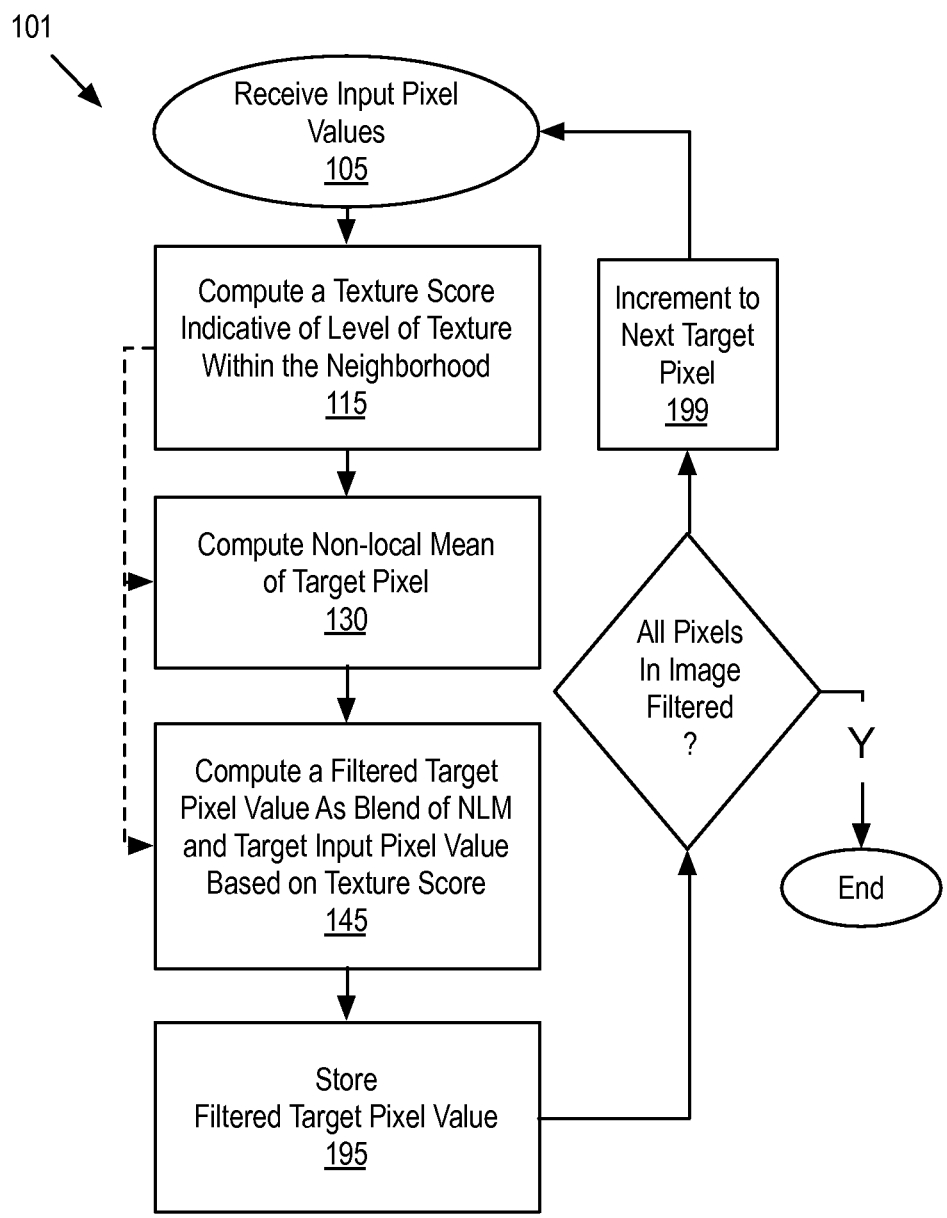
FIG. 1 is a flow diagram illustrating an image noise reduction method in accordance with embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for image denoising enhanced, at least in part, on an independent assessment of texture within the image. In contrast to conventional NLM filters, which suffer from detail loss for at least the reason that they only passively account for texture through definition of candidate patches and/or patch similarity assessments, the texture-enhanced filter embodiments described herein actively account for input image texture by way of a texture-sensitive blending operation. In embodiments, an average pixel value determined by color-based filter operations is blended with the "noisy" input pixel value. In embodiments, the blending is driven by one or more blending weight or coefficient that is indicative of texture so that the level of detail preserved by the enhanced noise reduction filter scales with the amount of texture. Embodiments herein may thereby denoise regions of an image that lack significant texture (i.e. are smooth) more aggressively than more highly textured regions. In further embodiments, the blending coefficient is further determined based on similarity scores of candidate patches with the number of those scores considered being based on the texture score. The enhanced filter in accordance with embodiments has been found to advantageously reduce the blurring effect typical of an NLM filter lacking such a texture-sensitive blending provision.

FIG. 1 is a flow diagram illustrating an image noise reduction method 101 in accordance with embodiments. Method 101 is to be performed for all pixels in a discrete image or frame with each iteration performed for one noisy target pixel $p_{in}$ that is filtered into a filtered output pixel $p_{out}$. The iteration illustrated in FIG. 1 may be implemented either serially or in parallel across multiple threads or execution units in a parallel processing architecture. Each iteration/thread of method 101 begins with receiving input pixel values $p_i$ at operation 105. The values received as input include the input target pixel value $p_{in}$ to be filtered and a plurality of pixel values within a spatial neighborhood of the target pixel. In an exemplary embodiment, the spatial neighborhood is dimensioned to something smaller than that of the image frame including $p_{in}$. Pixels outside this neighborhood are not given any weight in the determination of the filtered pixel value $p_{out}$. The spatial neighborhood may be of any predetermined size (e.g., a fixed K×K window smaller than an N×N pixel image frame) to correspondingly reduce the number of computations performed in method 101 for determination of a filtered pixel value $p_{out}$. In one embodiment, the size of the neighborhood, and therefore the size of the input pixel value sample received at operation 105, is predetermined to accommodate a particular non-local means algorithm, as further described below. Although definition of a neighborhood smaller than the N×N image is of practical advantage with respect to computational overhead, it is noted that embodiments herein are equally applicable to techniques that filter a target pixel with a computed weight for all pixels within an N×N image.

In a first embodiment, input pixel values $p_i$ are raw data in RGB space. While this raw data may be raw Bayer data, or the like, output by a camera sensor, in advantageous embodiments the pixel values $p_i$ have been preprocessed to some extent, for example linearized (including black level correction), and color shading corrected. The raw image data may also have had known bad pixels corrected, and lens shading corrections may have been performed upstream of denoise method 101. In a second embodiment, input pixel values $p_i$ received at operation 105 are in YUV space, with method 101 specifically operating on the luminance (Y) channel.

At operation 115, a texture score η indicative of a level of texture within the neighborhood is determined based on the input pixel values. The texture score η is an independent measure of texture that is to provide an additional degree of freedom to denoising method 101. In one embodiment, all of the input pixels $p_i$ received at operation 105 are utilized to compute the texture score η. For example, where all input pixels $p_i$ are associated with a neighborhood window utilized in a non-local means algorithm, texture score η is derived from this same population of input pixels $p_i$. Alternatively, texture score η is determined based on only a subset of the input pixels $p_i$. In other words, the window over which the texture score η is determined may be smaller than, but contained within, the neighborhood to which all the input pixels $p_i$ belong. In one exemplary embodiment where all input pixels $p_i$ received at operation 105 correspond to a single neighborhood of a target pixel $p_{in}$, texture score η is determined based on a quantitative assessment of pixel value variation over the entire neighborhood. While such a quantitative assessment may take many forms, exemplary embodiments are described in greater detail below in the context of FIG. 2 and FIG. 3.

Still referring to FIG. 1, a non-local mean is computed at operation 130 for the target pixel based on one or more values associated with the plurality of pixels within the spatial neighborhood of the target pixel received at operation 102. Any known non-local mean algorithm may be implemented at operation 130 to arrive at a mean target pixel value <q> for a target pixel $p_{in}$. In one exemplary embodiment, as illustrated in FIG. 1 by dashed line between operation 115 and 130, and as described in more detail below, the non-local mean computation is dependent upon the texture score determined at operation 115. In alternate embodiments however, the non-local mean computation at operation 130 is independent of texture assessment made at operation 115 and the texture score determined at operation 115 is utilized solely at blending operation 145 where the non-local mean from operation 130 and the noisy target input pixel value $p_{in}$ are blended based on the texture score to arrive at the filtered output pixel value $p_{out}$. The filtered output pixel value $p_{out}$ is then stored at operation 195, for example to an electronic memory, such as, but not limited to a register, volatile memory cell, non-volatile memory cell, etc. Input pixel $p_{in}$ is incremented at operation 199 across multiple serial iterations or parallel threads until all pixels in an image or frame have been filtered.

Figure 2:
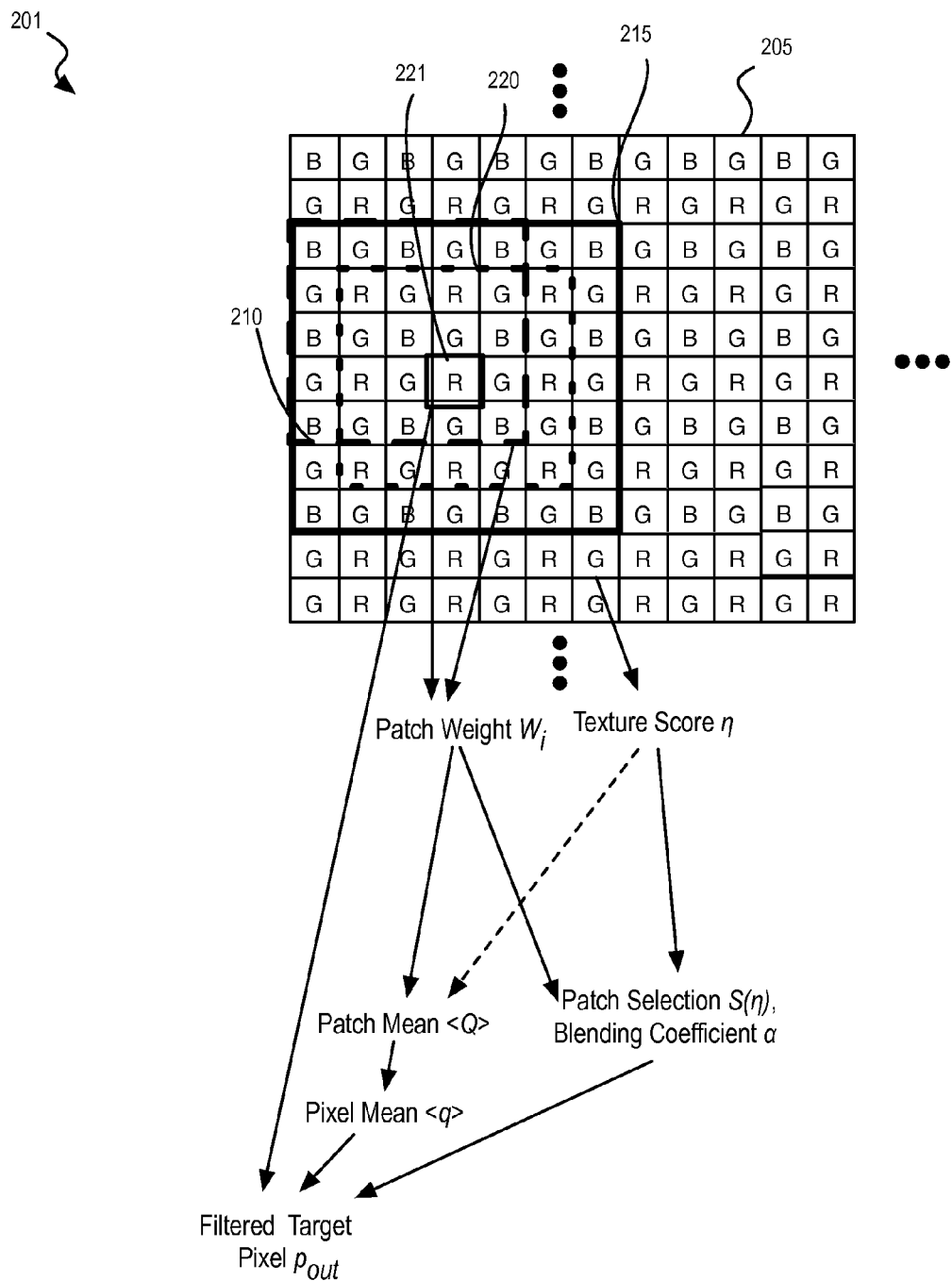
FIG. 2 is an illustration of pixel values and an image filter parameter dependency diagram in accordance with embodiments.
Figure 3:
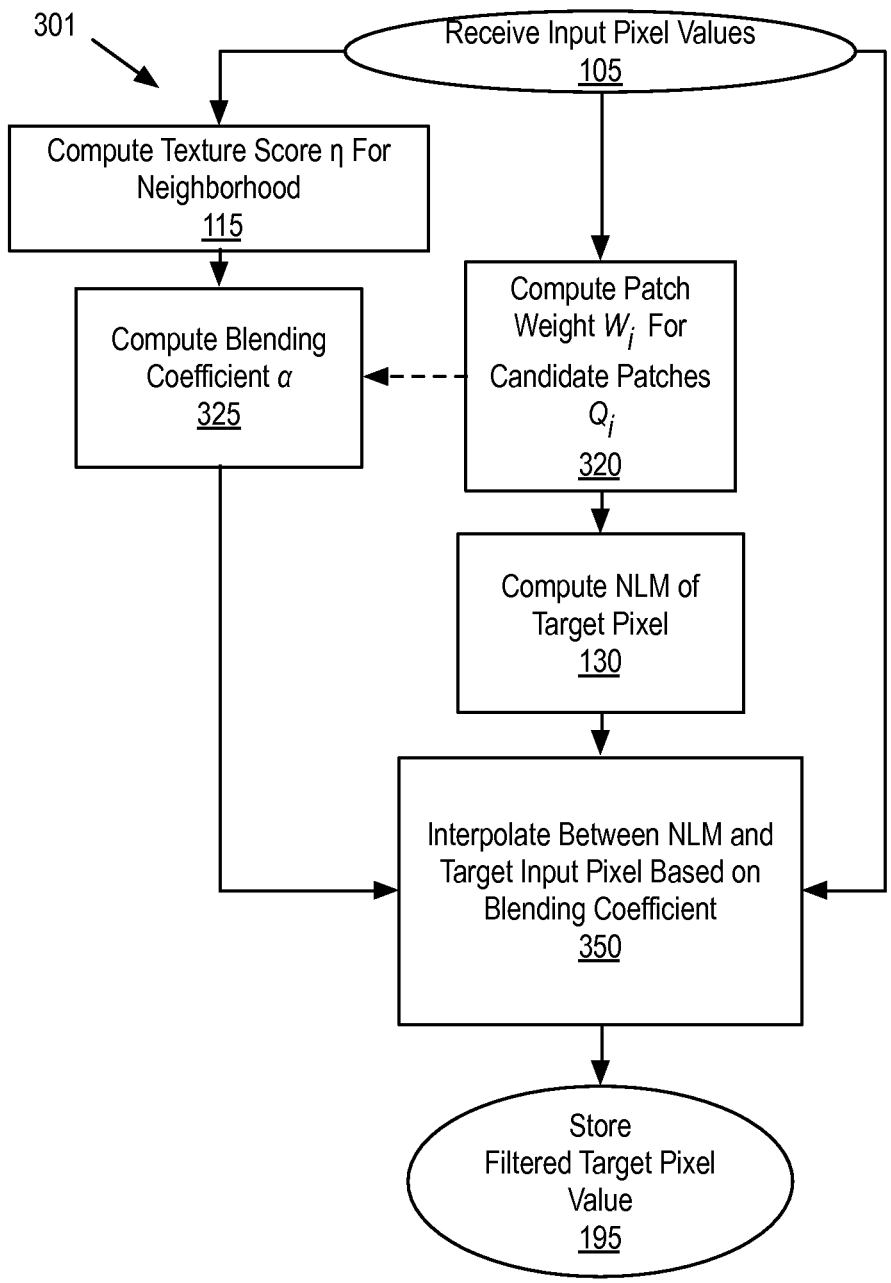
FIG. 3 is a flow diagram illustrating an image noise reduction method in accordance with embodiments.

FIG. 2 is an illustration of pixel values and an image filter parameter dependency diagram in accordance with embodiments. FIG. 3 is a flow diagram illustrating an image noise reduction method 301 in accordance with embodiments. The filtering depicted in schematic form in FIG. 2 may for example be performed as part of method 301, which is a specific embodiment of method 101 outlined above in the context of FIG. 1.

As shown in FIG. 2, an image or frame 201 includes a spatially correlated 2D pixel array 205 of N×N dimension. In the depicted embodiment, values of pixel array 205 are in RGB space. Within pixel array 205 is a local neighborhood 215 of K×K dimension surrounding target pixel 210. Pixel values from pixel array 205 may be received as input pixels $p_{in}$ at operation 105 (FIG. 3), for example.

As further illustrated in FIG. 3, at operation 320 a target pixel patch P including target pixel $p_{in}$ is compared to each of one or more candidate pixel patch $Q_i$ also contained within the set of all pixels of local neighborhood $Nbr_K(p_{in})$. In the example illustrated in FIG. 2, a target pixel patch 220 including target pixel 210 is contained within local neighborhood 215. One or more candidate pixel patch 221 may for example be of a predetermined size and overlap with a number of other candidate patches defined within neighborhood 215. The number of candidate patches 221 within a given neighborhood may for example be a function of the location of target pixel 210 within the image/frame (e.g., along an edge) and/or within neighborhood 215.

A candidate patch weight $W_i$ is computed corresponding to how similar each candidate patch is to the target pixel patch, referred to herein as "self-similarity." A candidate patch weight $W_i$ may for example be larger for a first candidate patch having greater similarity to the target patch than for a second candidate patch less similar to the target patch. Each candidate patch weight $W_i$ may be determined by way of any patch similarity scoring function to assess the similarity between the pixels i and $p_{in}$, for example with $0 \leq W(i, p_{in}) \leq 1$. In one embodiment, the similarity measure is computed as the sum of absolute differences. Such an embodiment may be advantageously implemented in fixed function or semi-programmable logic circuitry (e.g., an image signal processor). In an alternate embodiment, a Gaussian noise model is employed as a kernel function where a squared sum of differences is computed as the similarity measure. This alternative embodiment may be advantageously implemented in software executing on a fully programmable logic circuitry (e.g., an applications processor).

Returning to FIG. 3, at operation 115 an analysis of pixel value variation across neighborhood 215 is performed to compute the (local) texture score q. As illustrated by both FIG. 2 and FIG. 3, determination of texture score η is independent of patch weighting computations. Both patch weighting and the texture score η are then utilized in method 301 to determine where more or less NLM denoising is to be performed within an image frame.

As introduced above, texture score η is an estimator of dispersion across all, or a subset, of the pixel values within the neighborhood $Nbr_K(p_{in})$. Advantageously, the estimator is normalized by signal intensity of the neighborhood over which the estimate is made. The estimator may be based on a standard deviation or variance of the pixel value, for example. Although many texture scoring algorithms can be used, in one embodiment texture score η is computed as variance normalized by the mean signal intensity:

$$\eta = \frac{\text{Var}(Nbr_K(p))}{\text{Mean}(Nbr_K(p))}. \tag{Eq. 1}$$

A NLM of the target pixel $p_{in}$ is then computed at operation 130. In the exemplary embodiment, a patch mean <Q> is computed based on the candidate patch weights $W_i$ determined at operation 320. As one example, the mean patch <Q> is computed by averaging the candidate patches as weighted by their corresponding patch weight. However, any known NLM technique may be employed to arrive at the mean patch <Q> as embodiments herein are not further limited in this respect. From the mean patch <Q>, the averaged target pixel value <q> is determined, for example based on its position within the target patch P.

With the non-local mean of the target input pixel determined based on the input pixel values, the non-local mean is weighted relative to the target input pixel value $p_{in}$ inversely with a belief of local texture. In the exemplary embodiment illustrated in FIG. 2 and FIG. 3, the filtered pixel value $p_{out}$ is made a function of an independently derived belief of local texture by blending the non-local mean pixel value <q> and the target input pixel $p_{in}$ based on the texture score η. The blending function may be weighted by a blending coefficient α determined at operation 325. In the exemplary embodiment, an interpolation between the non-local mean pixel value <q> and the target input pixel $p_{in}$ is performed at operation 350 based on the blending coefficient α. In one specific example, the interpolation is a linear function of the blending coefficient α:

$$p_{out} = \alpha p_{in} + (1-\alpha)<q>. \quad \text{(Eq. 2)}$$

The blending coefficient α is at least based on texture score η, and is advantageously based on both texture score η and the patch weights $W_i$ determined at operation 320 in a manner that limits blending power of the non-local mean <q> (and/or enhances the blending power of the target input pixel $p_{in}$) in response to detecting the presence of greater local texture, and vice versa. If, for example, the local texture measure indicates high probability of texture, one should denoise strongly only when α is low (i.e., local self-similarity is high, for example in the presence of repetitive texture). In the exemplary embodiment illustrated in FIG. 3, where the blending function is a linear interpolation between the non-local mean <q> and the target input pixel $p_{in}$, blending coefficient α is indicative of the set of greatest patch weights $W_i$. Blending coefficient α is advantageously informed by the pattern of patch weights $W_i$ by selecting a number of greatest patch weights S as a function of the texture score η. Blending coefficient α is then computed at operation 325 based on a patch weight statistic associated with the selection of S patch weights. As one example, blending coefficient α is based on a patch weight statistic indicative of the central tendency of the selected set of patch weights:

$$\alpha = 1 - \frac{1}{|S(\eta)|} \sum_{i=1}^{S(\eta)} \tilde{W}_i, \quad \text{(Eq. 3)}$$

where $\tilde{W}_i$ is the set of weight values, which have been sorted in descending order. S is number of greatest patch weights to average, which is a function of the local texture score η. The form of Eq. 3 is dependent on the form of the blending coefficient α (e.g. Eq. 2), and so may vary such that the non-local mean <q> and target input pixel $p_{in}$ are weighted complementarily by the patch weight statistic (e.g., $$\frac{1}{|S(\eta)|} \sum_{i=1}^{S(\eta)} \tilde{W}_i \bigg).$$

With this architecture, the blending function is self-similarity guided by selecting a subset of the candidate patch weights determined via a similarity assessment. With the size of the set of weights selected further dependent on an independent texture measure, the filter function becomes more sensitive to content of a neighborhood.

In an embodiment, the number of patch weights S utilized to compute the blending coefficient α is inversely proportional to the local neighborhood texture. Where belief of texture is lower, the blending coefficient α is indicative of more patch weights. Where belief of texture is higher, the blending coefficient α is indicative of fewer patch weights. Hence, in a flat region where low texture is detected (e.g., texture score η is small), many weights may be included in the weight statistic computation. Yet if the self-similarity of each candidate patch is low, the many weights included may still result in a low average weight and the noisy input pixel $p_{in}$ having low blending power. If texture measure is high, one would expect to find a smaller correspondence between patches, so the number of patch weights may be reduced to allow strong filtering based on few patches. For example, in the presence of an edge texture score can be expected to increase, and the number of weights incorporated into blending coefficient α correspondingly reduced to only the few having the greatest similarity.

An integer number of the candidate patches S to represent in the set of weights may be determined in a variety of ways to implement the above principles. In one embodiment, the number of greatest patch weights S is computed by evaluating a closed form function. In an alternative embodiment, the number of greatest patch weights S(η) is determined by accessing a lookup table (LUT). In the first embodiment, the function may be any monotonically decreasing closed form function of the texture score that ranges between the total number of available candidate patches (i.e., all candidate patches) and a non-zero minimum threshold number of patches. In a further embodiment, the function is an exponentially decreasing function of the texture score η. In one exemplary embodiment, the function may be of the form:

$$S(\eta) = N_{min} + (N_{cand} - N_{min})e^{-\frac{\eta}{C}}, \quad \text{(Eq. 4)}$$

where $N_{cand}$ is the total number of candidate patches, $N_{min}$ is the minimum threshold number of candidate patches and C is a shaping coefficient determining the exponential function power. From this continuous expression, integer values may be readily derived through truncation, etc. In an alternative embodiment, a LUT associating different numbers of candidate patches with different texture scores is accessed using the texture score η as the index, or key, value. The range of possible texture scores may be partitioned in a predetermined number of windows or slots. Each window or slot is associated with a number of greatest patch weights S(η). In some embodiments, the LUT may be user configurable with S(η) being a user-defined configuration setting.

Figure 4:
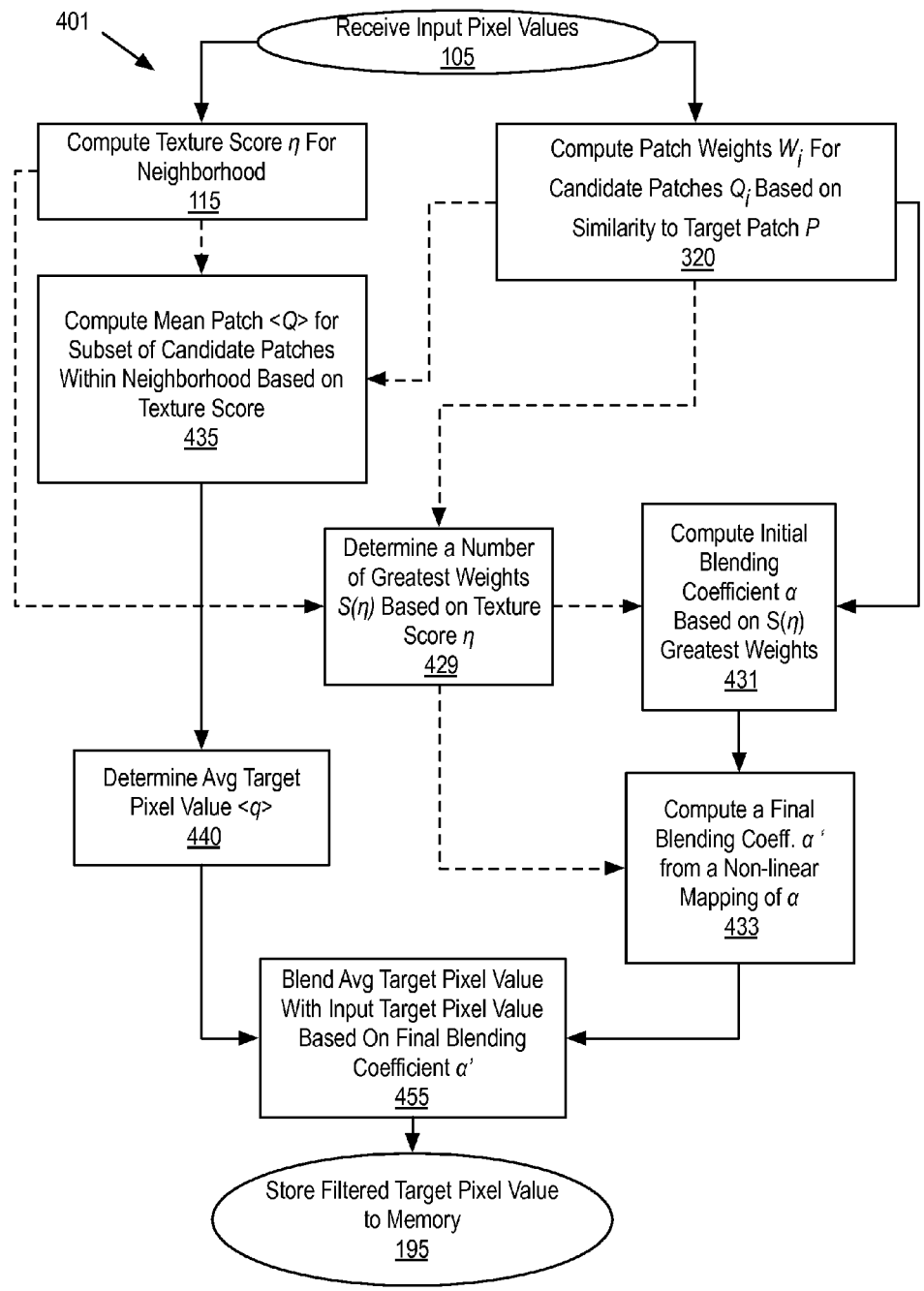
FIG. 4 is a flow diagram illustrating an image noise reduction method in accordance with embodiments.

In a further embodiment, as illustrated by the dashed arrow in FIG. 2, the texture score η is utilized to further modulate the NLM computation as a function of the independent local texture measure. FIG. 4 is a flow diagram illustrating an image noise reduction method 401 in accordance with such an embodiment. Method 401 further exemplifies how the blending coefficient α may also be derived through a non-linear mapping of an initial coefficient determined according to Eq. 3.

As depicted in FIG. 4, method 401 begins with receiving input pixel values at operation 105, and computing the texture score η and patch weights $W_i$, at operations 115 and 320 as described above. At operation 435, the mean patch <Q> is computed for a subset of candidate patches within the neighborhood. The subset of candidate patches is determined based on the texture score η. As such, texture score η impacts filtering both through the blending coefficient α and also through the NLM pixel value that will be blended with the noisy pixel. With the goal being to reduce the chance of using inappropriate or dissimilar patches in the NLM averaging process, the non-local mean computed at operation 435 is to include fewer candidate patches in response to detecting a greater level of texture. In one embodiment, the number of candidate patches to include in the NLM computation is determined by evaluating a closed form function. In an alternative embodiment, the number of candidate patches is determined by accessing a LUT associating a candidate patch number with a particular texture score, or range of scores. In a specific embodiment, the NLM is computed from the same candidate patches utilized in the computation of the blending coefficient α. At operation 440, the average target pixel value <q> is then determined from the patch mean <Q> computed from the subset of candidate patches.

Method 401 continues at operation 429 where the number patches associated with the S greatest patch weights is computed, for example following Eq. 4. At operation 431, blending coefficient α is computed based on the S(η) greatest weights, for example from a patch weight statistic indicative of the central tendency of the selected set of patch weights (e.g., following Eq. 3). At operation 433, a final blending coefficient α' is computed by performing a non-linear mapping of blending coefficient α. The mapping function itself is parameterized by the local texture score η and is to provide a desired level of priority to the input value of the target pixel. In one embodiment, the final blending coefficient α' is determined by accessing a lookup table (LUT) associating different texture scores with different mappings between initial and final blending coefficients. Such mappings may also be user-definable. In an alternative embodiment, the final blending coefficient α' is computed by evaluating a closed form function of the texture score η with Eq. 5 providing one example:

$$\alpha' = \frac{1}{1+e^{-a_0(\alpha-b(\eta))}}, \quad \text{(Eq. 5)}$$

where: $b(\eta)=\alpha_1\eta^2+\alpha_2\eta+\alpha_3$, and $a_0=5$; $a_1=1.75$, $a_2=-1.95$, $a_3=0.7$.

Method 401 then continues at operation 455 where the NLM target pixel value <q> determined at operation 440 is blended with the input target pixel value $p_{in}$ based on the final blending coefficient α'. In one exemplary embodiment, the blending operation entails a linear interpolation using the final blending coefficient α' to complementarily weight the input pixel value and the NLM pixel value (e.g., applying Eq. 2 with α' replacing α). Method 401 then completes with storing the filtered pixel value $p_{out}$ to an electronic memory. In further embodiments, filtered pixel value $p_{out}$ is further output to a display pipeline, and/or encoding pipeline, and/or wireless transmission pipeline.

Figure 5A:
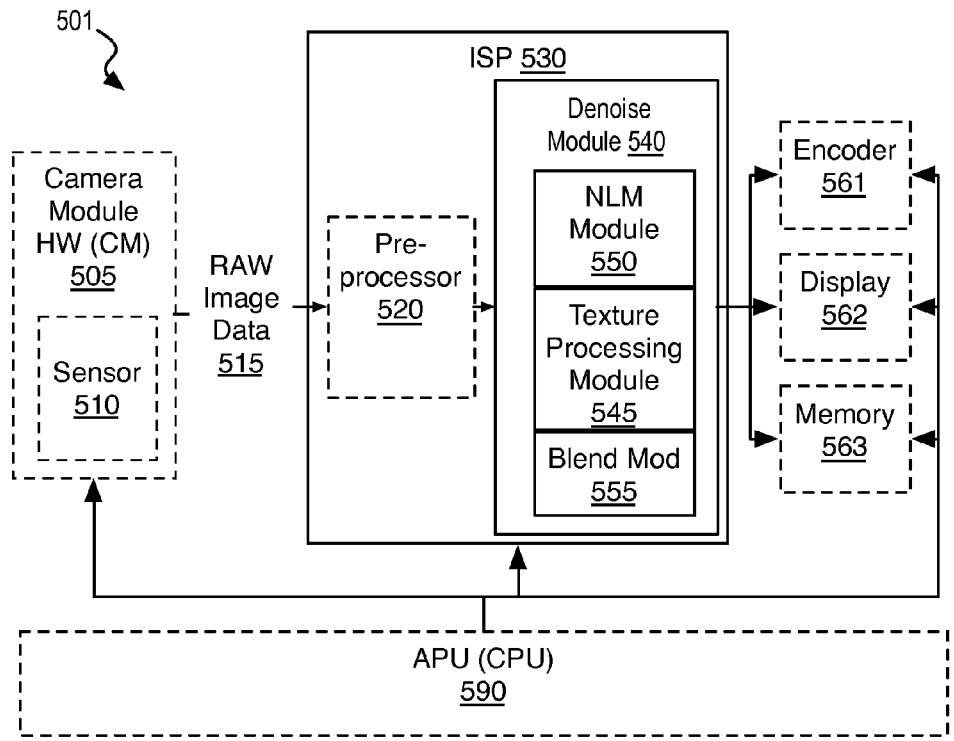
FIG. 5A is a functional block diagram of a system including an image-denoising module that includes an independent texture detection stage, in accordance with one or more embodiment.

FIG. 5A is a functional block diagram of a system 501 including an image-denoising module 540 that includes an independent texture detection stage, in accordance with one or more embodiment. Image processing system 501 includes an input port to receive input pixel values for a target pixel and a plurality of pixels within a spatial neighborhood of the target pixel. In embodiments, the texture-enhanced NLM noise reduction techniques described herein and associated circuitry to perform the processing is positioned within an image pipeline to operate in the RGB space with input pixel values included in raw data 515.

In the exemplary embodiment, raw data 515 originates from camera hardware module (CM) 505 that includes a camera sensor 510, both of which may be included as part of system 501, or not as denoted by the dashed line blocks. Sensor 510 may be a QXGA, WQXGA, or QSXGA-format digital image device, for example. Camera sensor 110 may provide a color resolution of 10 bits, or more per pixel, and may be further operable to capture continuous video frames progressively. Sensor 510 may have a pixel frequency of 170 MHz, or more. Camera sensor 510 may include an RGB Bayer color filter, an analog amplifier, an A/D converter, other components to convert incident light into a digital signal corresponding to raw image data. Sensor 510 may be controlled to operate a rolling shutter or electronic focal plane shutter process where pixels are read out progressively in a line-sequential fashion for a frame. Raw data is input to ISP 530. ISP 530 is to receive and analyze frames of raw video data during the horizontal and/or vertical blanking periods associated with CM 505. During raw image data processing, ISP 530 performs noise reduction with image denoise module 540. In the exemplary embodiment, ISP 530 further includes a preprocessor 520 to perform one or more of, pixel linearization, and shading compensation where raw Bayer data, or the like, output by camera sensor 505 is linearized (including also black level correction) and color shading corrected. The raw image data chromaticity (white balance) may be further calculated. Known bad pixels corrected, and lens shading corrections may also be performed upstream of denoise module 540. In an alternative embodiments, the amount of preprocessing performed by preprocessor 520 is minimal, for example including only dark noise removal upstream of denoise module 540.

In exemplary embodiment illustrated in FIG. 5A, image denoising module 540 is implemented by logic circuitry of an image signal processor (ISP) 530. In alternate embodiments, image denoising module 540 is implemented as one or more software thread instantiated on logic circuitry executing for example on a programmable processor, such as a applications processing unit (APU) or central processing unit (CPU). Denoising module 540 is coupled to an input port of system 501, for example downstream of preprocessor 520. Denoising module 540 further includes a texture processing module 545 that is to compute a texture score indicative of a level of texture detected or believed to exist within the neighborhood based on the input pixel values. Denoising module 540 further includes a NLM module 550 to compute a non-local mean of the target input pixel based on the input pixel values. Denoising module 540 further includes a blending module 555 to modulate a weighting of the non-local mean relative to the target input pixel value inversely with the level of texture by computation of a filtered target pixel value that is a blend of the non-local mean and the target input pixel value based on the texture score. The texture processing module 545, NLM module 550, and blender 555 are commutatively coupled together. Any or all of the texture processing module 545, NLM module 550, and blender 555 may be implemented with fixed function logic circuitry or programmable logic circuitry.

Texture processing module 545 may be considered an independent stage of image denoising, which interacts and informs the operation of NLM module 550 and blending module 555, each serving as separate stages of image denoising. In embodiments, NLM module 550 further includes logic circuitry to compute a patch weight for candidate patches within the neighborhood by performing a comparison between a number of candidate patches and a target patch of pixels within the neighborhood that contains the target pixel. Blending module 555 then further includes logic circuitry to compute a blending coefficient based on the patch weights and the texture score. Blending module 555 also further includes logic circuitry to blend the non-local mean with the target input pixel value by an interpolation between the non-local mean and the target input pixel based on the blending coefficient.

In some embodiments, texture processing module 550 further includes logic circuitry to select a set of greatest patch weights in a neighborhood based on a texture score. In further embodiments, texture processing module 550 further includes logic circuitry to compute a blending coefficient based on a patch weight statistic indicative of the central tendency of the selected set of patch weights. Blending module 555 then further comprises logic circuitry to take a weighted sum of the non-local mean and the target input pixel, the non-local mean and target input pixel weighted complementarily by the patch weight statistic.

In some embodiments, texture processing module 545 further comprises logic circuitry to determine an integer number of the candidate patches to represent in the set of weights with at least one of logic circuitry to evaluate a monotonically decreasing closed form function of the texture score ranging between the number of candidate patches and a non-zero minimum, or logic circuitry to access a lookup table (LUT) using the texture score as an index value, the LUT associating different numbers of candidate patches with different texture scores.

In some embodiments, blending module 555 further comprises logic circuitry to compute the blending coefficient based on the patch weights and the texture score that further includes logic circuitry to compute an initial blending coefficient from a patch weight statistic indicative of the central tendency of the selected set of patch weights, and logic circuitry to compute the blending coefficient through a mapping of the initial blending coefficient, wherein the mapping is a function of the texture score.

In some embodiments, the NLM module 550 further includes logic circuitry to select a subset of candidate patches within the neighborhood based on the texture score to include fewer candidate patches in response to detecting a greater level of texture. The NLM module 550 is then to compute a non-local mean of the target input pixel from an average patch determined by an average of the subset of candidate patches as weighted by their corresponding patch weight.

As also illustrated in FIG. 5A, image processing system 501 further includes an output port coupled to at least of an electronic memory 563, a display 562, or an encoder 561. Memory 563 is to store the filtered image pixel as a filtered representation of the raw image data 511. Encoder 561 is to encode the filtered image pixel as a filtered representation of raw image data 511. Display 562 is to present the filtered image pixel as a filtered representation of image data 511. In further embodiments, one or more of ISP 530 and image denoising module 540 is coupled to an APU (CPU) 590 having a user space and a kernel space. Applications executed on the user space may control denoising module 540 (e.g., defining S-η associations in a LUT or a value of shaping coefficient C, etc.).

Figure 5B:
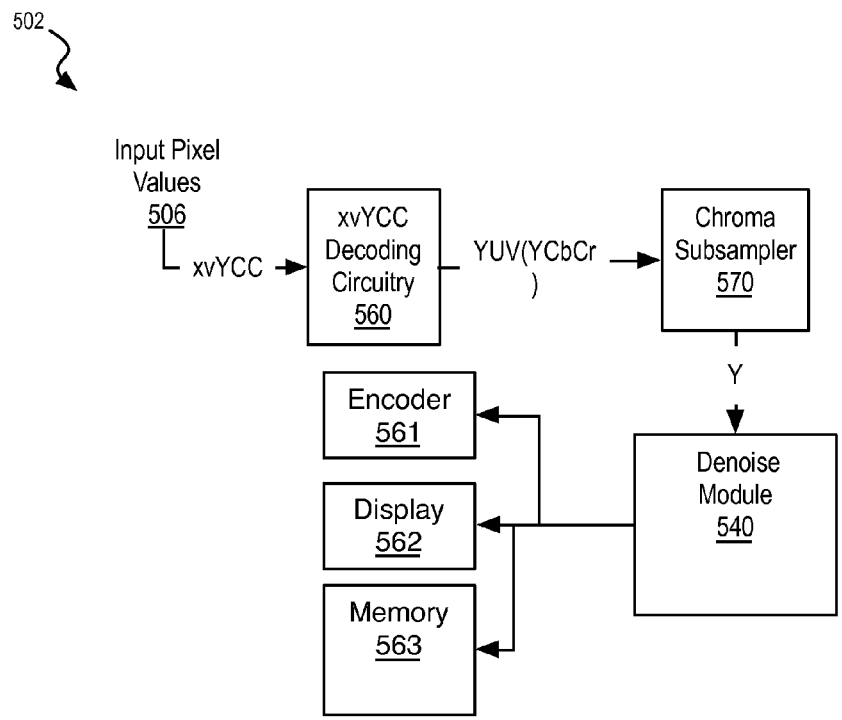
FIG. 5B is a functional block diagram of a system including an image-denoising module that includes an independent texture detection stage, in accordance with one or more alternate embodiment.

FIG. 5B is a functional block diagram of a system 502 including an image denoising module 540 that includes an independent texture detection stage, in accordance with one or more alternate embodiment. In this exemplary embodiment, the NLM noise reduction techniques and associated circuitry is positioned within an image pipeline to operate in the color corrected and converted YUV data space. FIG. 5B illustrates one exemplary system architecture in which image denoise module 540 is operative as a down sample filter for a video processing pipeline. System 502 for example has a pixel value input port coupled to an output of a streaming video pipeline having any known configuration. This video pipeline may also include sensor 510 (FIG. 5A) operative to output raw video data associated with multiple consecutively exposed frames in conformance with any known streaming protocol, such as a MIPI or other protocol. In the exemplary embodiment, xvYCC input pixel data 506 received by system 502 is converted to YUV(Cb,Cr) format by decoding circuitry 560. Chroma subsampler 570 down samples, for example from 4:4:4 YUV data to 4:4:0 data. Denoise module 540 then operates on the subsampled Y' channel data in the chroma subsample data set with the modules substantially as described above in the context of FIG. 5A.

Figure 6:
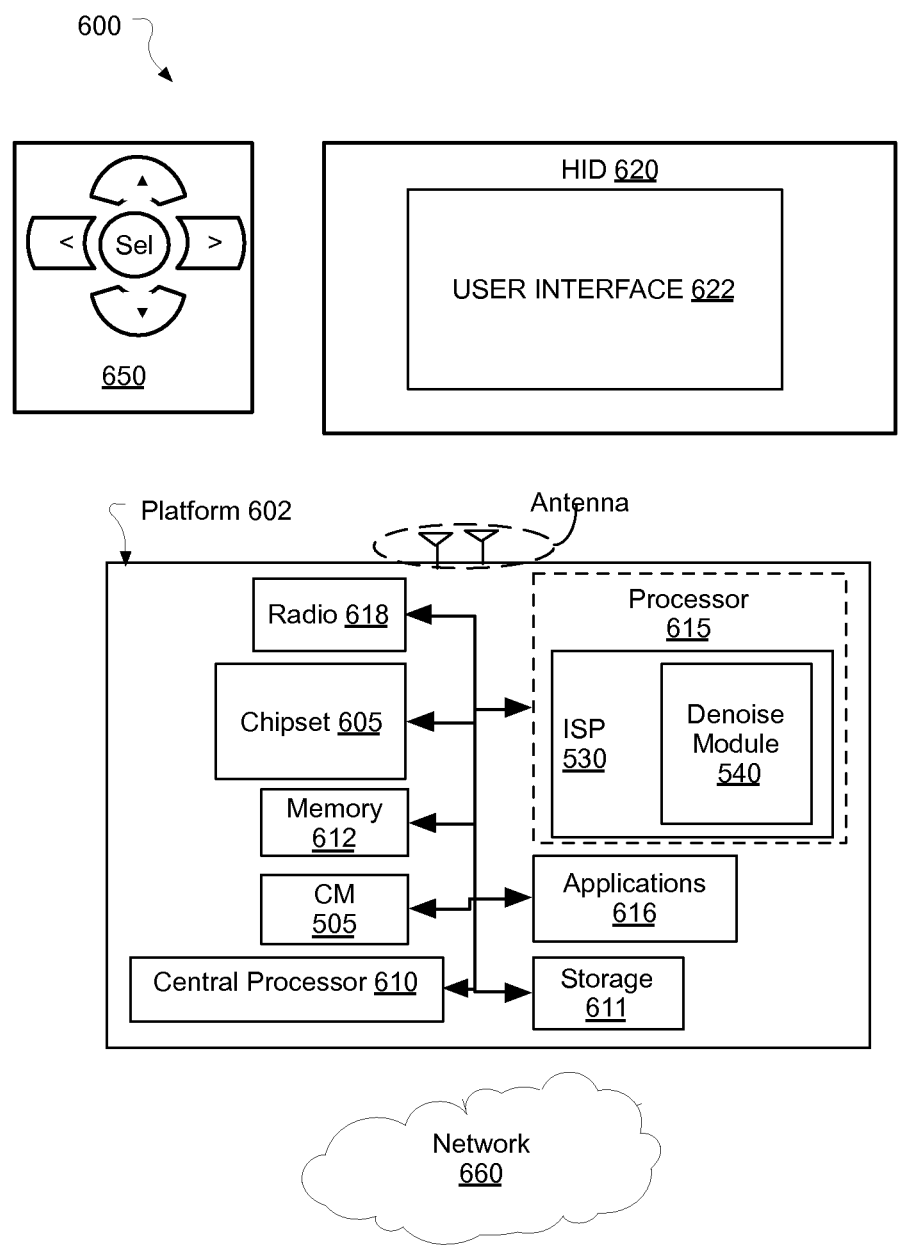
FIG. 6 is a diagram of an exemplary ultra-low power system employing an image processor including the system of FIG. 5A or 5B, in accordance with embodiments.

FIG. 6 is a diagram of an exemplary ultra-low power system 600 employing image denoise module 540, in accordance with one or more embodiment. System 600 may be a mobile device although system 600 is not limited to this context. For example, system 600 may be incorporated into a wearable computing device, ultra-laptop computer, tablet, touch pad, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 600 may be incorporated into a large format television, set-top box, desktop computer, or other home or commercial network device.

System 600 includes a device platform 602 that may implement all or a subset of the various texture enhanced NLM image denoising methods and any of the texture enhanced NLM image denoising systems described above in the context of FIG. 1-FIG. 5. In various exemplary embodiments, processor 615 executes texture enhanced NLM image denoising algorithms. Processor 615 includes logic circuitry in ISP 530 for example to implement texture enhanced NLM image denoising algorithms, such as any of those described elsewhere herein. In some embodiments, one or more computer readable media may store instructions, which when executed by CPU 610 and/or processor 615, cause the processor(s) to execute one or more texture enhanced NLM image denoising algorithm, such as any of those described in detail above. One or more image data frame filtered by image denoising module 540 may then be stored in electronic memory 612 as filtered image data.

In embodiments, device platform 602 is coupled to a human interface device (HID) 620. Platform 602 may collect raw image data with CM 505, which is filtered and output to HID 620. A navigation controller 650 including one or more navigation features may be used to interact with, for example, device platform 602 and/or HID 620. In embodiments, HID 620 may include any television type monitor or display coupled to platform 602 via radio 618 and/or network 660. HID 620 may include, for example, a computer display screen, touch screen display, video monitor, television-like device, and/or a television.

Under the control of one or more software applications 616, device platform 602 may display user interface 622 on HID 620. Movements of the navigation features of controller 650 may be replicated on a display (e.g., HID 620) by movements of a pointer, cursor, focus ring, or other visual indicators displayed on the display. For example, under the control of software applications 616, the navigation features located on navigation controller 650 may be mapped to virtual navigation features displayed on user interface 622.

In embodiments, device platform 602 may include any combination of CM 505, chipset 605, processors 610, 615, memory/storage 612, applications 616, and/or radio 618. Chipset 605 may provide intercommunication among processors 610, 615, memory 612, video processor 615, applications 616, or radio 618.

One or more of processors 610, 615 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 612 may be implemented as a volatile memory device such as, but not limited to, a Random Access Memory (RAM), Dynamic Random Access Memory (DRAM), or Static RAM (SRAM). Memory 612 may also be implemented as a non-volatile storage device such as, but not limited to flash memory, battery backed-up SDRAM (synchronous DRAM), magnetic memory, phase change memory, and the like.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The texture enhanced NLM image denoising architecture and associated algorithms as described herein may be implemented in various hardware architectures, cell designs, or "IP cores."

Figure 7:
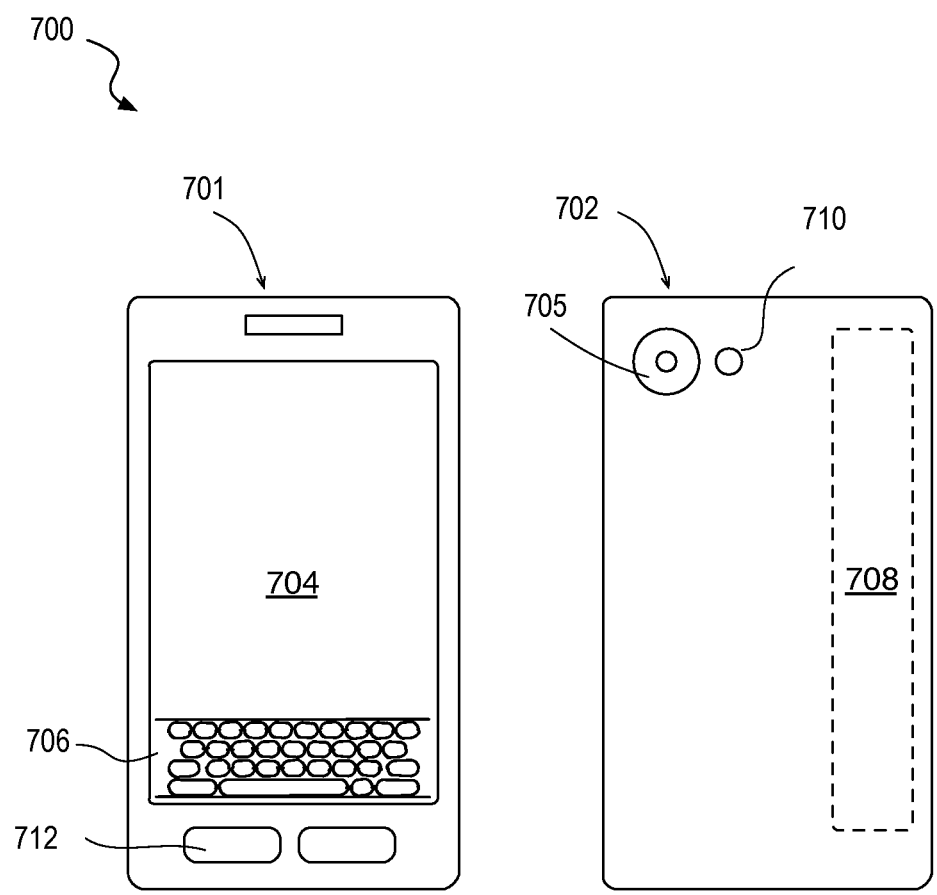
FIG. 7 is a diagram of an exemplary mobile handset platform, arranged in accordance with one or more embodiment.

As described above, system 600 may be embodied in varying physical styles or form factors. FIG. 7 further illustrates embodiments of a mobile handset device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example. Examples of a mobile computing device may include an ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, mobile handset device 700 may include a housing with a front 701 and back 702. Device 700 includes a display 704, an input/output (I/O) device 706, and an integrated antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. Embodiments are not limited in this context. Integrated into at least the back 702 is camera 705 (e.g., including a lens, an aperture, and an imaging sensor), and a flash 710, both of which may be components of a CM through which image frames are exposed and output to a texture enhanced NLM image denoising system, such as any of those described elsewhere herein.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiment, a computer-implemented image noise reduction method includes receiving input pixel values for a target pixel and a plurality of pixels within a spatial neighborhood of the target pixel. The method includes computing a texture score indicative of a level of texture within the neighborhood based on the input pixel values. The method includes computing a non-local mean of the target input pixel based on the input pixel values. The method includes modulating a weighting of the non-local mean relative to the target input pixel value inversely with the level of texture by computing a filtered target pixel value that is a blend of the non-local mean and the target input pixel value based on the texture score, and the method includes storing the filtered target pixel value to an electronic memory.

In furtherance of the first embodiment, computing the non-local mean of the target input pixel further comprises determining a number of candidate patches within the neighborhood from which the non-local mean is computed based on the texture score to include fewer candidate patches in response to detecting a greater level of texture.

In furtherance of the first embodiment, the method further includes computing a patch weight for one or more candidate patch within the neighborhood by performing a comparison between each candidate patch and a target patch of pixels within the neighborhood that contains the target pixel. The method further includes computing a blending coefficient based on the patch weights and the texture score. The method further includes blending the non-local mean with the target input pixel value by interpolating between the non-local mean and the target input pixel based on the blending coefficient.

In furtherance of the embodiment immediately above, the method further includes selecting a set of the greatest patch weights based on the texture score. Computing the blending coefficient based on the patch weights and the texture score further comprises computing a blending coefficient based on a patch weight statistic indicative of the central tendency of the selected set of patch weights. Interpolating between the non-local mean and the target input pixel based on the blending coefficient further comprises taking a weighted sum of the non-local mean and the target input pixel, the non-local mean and the target input pixel weighted complementarily by the patch weight statistic.

In furtherance of the embodiment immediately above, selecting the set of the patch weights based on the texture score further comprises determining an integer number of the candidate patches to represent in the set of weights by at least one of evaluating a monotonically decreasing closed form function of the texture score ranging between the number of candidate patches and a non-zero minimum, or accessing a lookup table (LUT) using the texture score as an index value, the LUT associating different numbers of candidate patches with different texture scores.

In furtherance of the embodiment immediately above, selecting the set of patch weights based on the texture score further comprises determining the number of candidate patches to represent in the set by evaluating a monotonically decreasing closed form function of the texture score, and of the total number of candidate patches.

In furtherance of the first embodiments, the method further includes selecting a set of the largest patch weights based on the texture score. Computing the blending coefficient based on the patch weights and the texture score further includes computing an initial blending coefficient from a patch weight statistic indicative of the central tendency of the selected set of patch weights, and computing the blending coefficient through a mapping of the initial blending coefficient, wherein the mapping is a function of the texture score.

In furtherance of the embodiment immediately above, computing the final blending coefficient further comprises at least one of evaluating a monotonically decreasing closed form function of the texture score, or accessing a lookup table (LUT) using the texture score as an index value, the LUT associating different texture scores with different mappings between initial and final blending coefficients.

In furtherance of the first embodiments, computing the texture score further includes computing an estimator of dispersion across all, or a subset, of the pixel values within the neighborhood, and normalizing the dispersion estimator by signal intensity.

In furtherance of the first embodiments, computing the non-local mean of the target input pixel further includes computing a patch weight for each candidate patch within the neighborhood by performing a comparison between a number of candidate patches and a target patch of pixels within the neighborhood that contains the target pixel, computing an average patch by averaging the candidate patches as weighted by their corresponding patch weight.

In one or more second embodiment, a computer-implemented image noise reduction method includes receiving input pixel values for a target pixel and a plurality of pixels within a spatial neighborhood of the target pixel. The method includes computing a texture score indicative of a level of texture within the neighborhood. The method includes computing a patch weight for one or more candidate patch within the neighborhood by performing a comparison between each of the candidate patches and a target patch of pixels that contains the target pixel. The method includes selecting a set of the greatest patch weights representing an integer number of the candidate patches by evaluating a monotonically decreasing closed form function of the texture score, and of the total number of candidate patches. The method includes computing an initial blending coefficient from a patch weight statistic indicative of the central tendency of the selected set of patch weights. The method includes computing a final blending coefficient through a mapping of the initial blending coefficient, wherein the mapping is a function of the texture score. The method includes selecting a subset of candidate patches within the neighborhood based on the texture score to include fewer candidate patches in response to detecting a greater level of texture. The method includes computing a non-local mean of the target input pixel from an average patch determined by averaging the subset of candidate patches as weighted by their corresponding patch weight. The method includes blending the non-local mean with the target input pixel value by linearly interpolating between the non-local mean and the target input pixel based on the final blending coefficient. The method includes storing the blend to memory as the filtered target pixel value.

In furtherance of the second embodiments, computing the texture score further includes computing an estimator of dispersion across all, or a subset, of the pixel values within the neighborhood, and normalizing the dispersion estimator by signal intensity.

In one or more third embodiment, an image processing system includes an input port to receive input pixel values for a target pixel and a plurality of pixels within a spatial neighborhood of the target pixel. The system includes a denoising module coupled to the input port. The denoising module further includes a texture processing module to compute a texture score indicative of a level of texture detected within the neighborhood based on the input pixel values. The denoising module further includes a NLM module to compute a non-local mean of the target input pixel based on the input pixel values. The denoising module further includes a blending module to modulate a weighting of the non-local mean relative to the target input pixel value inversely with the level of texture by computing a filtered target pixel value that is a blend of the non-local mean and the target input pixel value based on the texture score. The system further includes an output port coupled to the denoising module to transmit the filtered target pixel value to an electronic memory.

In furtherance of the third embodiments, the NLM module further comprises logic circuitry to compute a patch weight for candidate patches within the neighborhood by performing a comparison between a number of candidate patches and a target patch of pixels within the neighborhood that contains the target pixel. The blending module further comprises logic circuitry to compute a blending coefficient based on the patch weights and the texture score, and logic circuitry to blend the non-local mean with the target input pixel value by an interpolation between the non-local mean and the target input pixel based on the blending coefficient.

In furtherance of the embodiment immediately above, the texture processing module further comprises logic circuitry to select a set of greatest patch weights based on the texture score, and logic circuitry to compute a blending coefficient based on a patch weight statistic indicative of the central tendency of the selected set of patch weights. The blending module further comprises logic circuitry to take a weighted sum of the non-local mean and the target input pixel, the non-local mean and target input pixel weighted complementarily by the patch weight statistic.

In furtherance of the embodiment immediately above, the texture processing module further comprises logic circuitry to determine an integer number of the candidate patches to represent in the set of weights with at least one of logic circuitry to evaluate a monotonically decreasing closed form function of the texture score ranging between the number of candidate patches and a non-zero minimum, or logic circuitry to access a lookup table (LUT) using the texture score as an index value, the LUT associating different numbers of candidate patches with different texture scores.

In furtherance of the third embodiments, the texture processing module further includes logic circuitry to select a set of the largest patch weights based on the texture score. The blending module further comprises logic circuitry to compute the blending coefficient based on the patch weights and the texture score. The blending module further includes logic circuitry to compute an initial blending coefficient from a patch weight statistic indicative of the central tendency of the selected set of patch weights. The blending module further includes logic circuitry to compute the blending coefficient through a mapping of the initial blending coefficient, wherein the mapping is a function of the texture score.

In furtherance of the third embodiments, the blending module further includes logic circuitry to compute the final blending coefficient with at least one of logic circuitry to evaluate a monotonically decreasing closed form function of the texture score, or logic circuitry to access a lookup table (LUT) using the texture score as an index value, the LUT associating different texture scores with different mappings between initial and final blending coefficients.

In furtherance of the third embodiments, the NLM module further includes logic circuitry to select a subset of candidate patches within the neighborhood based on the texture score to include fewer candidate patches in response to detecting a greater level of texture. The NLM module further includes logic circuitry to compute a non-local mean of the target input pixel from an average patch determined by averaging the subset of candidate patches as weighted by their corresponding patch weight.

In one or more fourth embodiment, a mobile computing platform includes the image processing system of the third embodiments, and a camera hardware module (CM) coupled to the input to generate raw image data in an RGB space that includes the input pixel values. The platform further includes at least one of the electronic memory, an encoder or display coupled to the output, the memory to store the filtered image pixel as a filtered representation of the image data, the encoder to encode the filtered image pixel as a filtered representation of the image data, and the display to present the filtered image pixel as a filtered representation of the image data.

In one or more fifth embodiment, an image processing system includes an input means to receive input pixel values for a target pixel and a plurality of pixels within a spatial neighborhood of the target pixel. The system further includes a denoising means further including a texture processing means coupled to the input means to compute a texture score indicative of a level of texture detected within the neighborhood based on the input pixel values. The denoising means further includes a non-local mean (NLM) computation means coupled to the input means to compute a non-local mean of the target input pixel based on the input pixel values. The denoising means further includes a blending means coupled to the texture processing means, NLM computation means and input means, the blending means to modulate a weighting of the non-local mean relative to the target input pixel value inversely with the level of texture by computing a filtered target pixel value that is a blend of the non-local mean and the target input pixel value based on the texture score. The image processing system means further includes an output means coupled to the blending means to write the filtered target pixel value to an electronic memory.

In one or more sixth embodiment, one or more computer-readable storage media have instructions stored thereon, which when executed by a processor, cause the processor to perform any one of the first embodiments above.

In one or more seventh embodiment, one or more computer-readable storage media includes instructions stored thereon, which when executed by a processor, cause the processor to perform a method including receiving input pixel values for a target pixel and a plurality of pixels within a spatial neighborhood of the target pixel. The method includes computing a texture score indicative of a level of texture within the neighborhood based on the input pixel values. The method includes computing a non-local mean of the target input pixel based on the input pixel values. The method includes modulating a weighting of the non-local mean relative to the target input pixel value inversely with the level of texture by computing a filtered target pixel value that is a blend of the non-local mean and the target input pixel value based on the texture score. The method includes storing the filtered target pixel value to an electronic memory.

In furtherance of the seventh embodiments, the media includes instructions stored thereon, which when executed by the processor, further cause the processor to perform the method further including determining a number of candidate patches within the neighborhood from which the non-local mean is computed based on the texture score to include fewer candidate patches in response to detecting a greater level of texture.

In furtherance of the seventh embodiments, the media includes instructions stored thereon, which when executed by the processor, further cause the processor to perform the method further including computing a similarity score for candidate patches within the neighborhood by performing a comparison between a number of candidate patches and a target patch of pixels within the neighborhood that contains the target pixel, computing a blending coefficient based on the similarity score and the texture score, and blending the non-local mean with the target input pixel value by interpolating between the non-local mean and the target input pixel based on the blending coefficient.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented image noise reduction method, comprising:
   receiving input pixel values for a target pixel and a plurality of pixels within a spatial neighborhood of the target pixel;
   computing a texture score indicative of a level of texture within the neighborhood based on the input pixel values;
   computing a non-local mean of the target input pixel based on the input pixel values;
   modulating a weighting of the non-local mean relative to the target input pixel value inversely with the level of texture by computing a filtered target pixel value that is a blend of the non-local mean and the target input pixel value based on the texture score; and
   storing the filtered target pixel value to an electronic memory.

2. The method of claim 1, wherein computing the non-local mean of the target input pixel further comprises determining a number of candidate patches within the neighborhood from which the non-local mean is computed based on the texture score to include fewer candidate patches in response to detecting a greater level of texture.

3. The method of claim 1, further comprising:
   computing a patch weight for one or more candidate patch within the neighborhood by performing a comparison between each candidate patch and a target patch of pixels within the neighborhood that contains the target pixel;
   computing a blending coefficient based on the patch weights and the texture score; and
   blending the non-local mean with the target input pixel value by interpolating between the non-local mean and the target input pixel based on the blending coefficient.

4. The method of claim 3, further comprising:
   selecting a set of the greatest patch weights based on the texture score;
   wherein computing the blending coefficient based on the patch weights and the texture score further comprises computing a blending coefficient based on a patch weight statistic indicative of the central tendency of the selected set of patch weights; and
   wherein interpolating between the non-local mean and the target input pixel based on the blending coefficient further comprises taking a weighted sum of the non-local mean and the target input pixel, the non-local mean and the target input pixel weighted complementarily by the patch weight statistic.

5. The method of claim 4, wherein selecting the set of the patch weights based on the texture score further comprises determining an integer number of the candidate patches to represent in the set of weights by at least one of:
   evaluating a monotonically decreasing closed form function of the texture score ranging between the number of candidate patches and a non-zero minimum; or
   accessing a lookup table (LUT) using the texture score as an index value, the LUT associating different numbers of candidate patches with different texture scores.

6. The method of claim 5, wherein selecting the set of patch weights based on the texture score further comprises determining the number of candidate patches to represent in the set by evaluating a monotonically decreasing closed form function of the texture score, and of the total number of candidate patches.

7. The method of claim 3, further comprising:
   selecting a set of the largest patch weights based on the texture score; and
   wherein computing the blending coefficient based on the patch weights and the texture score further comprises:
   computing an initial blending coefficient from a patch weight statistic indicative of the central tendency of the selected set of patch weights; and
   computing a final blending coefficient through a mapping of the initial blending coefficient, wherein the mapping is a function of the texture score.

8. The method of claim 7, wherein computing the final blending coefficient further comprises at least one of:

evaluating a monotonically decreasing closed form function of the texture score; or
accessing a lookup table (LUT) using the texture score as an index value, the LUT associating different texture scores with different mappings between initial and final blending coefficients.

9. The method of claim 1, wherein computing the texture score further comprises:
computing an estimator of dispersion across all, or a subset, of the pixel values within the neighborhood; and
normalizing the dispersion estimator by signal intensity.

10. The method of claim 1, wherein computing the non-local mean of the target input pixel further comprises:
computing a patch weight for each candidate patch within the neighborhood by performing a comparison between a number of candidate patches and a target patch of pixels within the neighborhood that contains the target pixel; and
computing an average patch by averaging the candidate patches as weighted by their corresponding patch weight.

11. A computer-implemented image noise reduction method, comprising:
receiving input pixel values for a target pixel and a plurality of pixels within a spatial neighborhood of the target pixel;
computing a texture score indicative of a level of texture within the neighborhood;
computing a patch weight for one or more candidate patch within the neighborhood by performing a comparison between each of the candidate patches and a target patch of pixels that contains the target pixel;
selecting a set of the greatest patch weights representing an integer number of the candidate patches by evaluating a monotonically decreasing closed form function of the texture score, and of the total number of candidate patches;
computing an initial blending coefficient from a patch weight statistic indicative of the central tendency of the selected set of patch weights;
computing a final blending coefficient through a mapping of the initial blending coefficient, wherein the mapping is a function of the texture score;
selecting a subset of candidate patches within the neighborhood based on the texture score to include fewer candidate patches in response to detecting a greater level of texture;
computing a non-local mean of the target input pixel from an average patch determined by averaging the subset of candidate patches as weighted by their corresponding patch weight;
blending the non-local mean with the target input pixel value by modulating a weighting of the non-local mean relative to the target input pixel value inversely with the level of texture by computing a filtered target pixel value that is a blend of the non-local mean and the target input pixel value based on the final blending coefficient; and
storing the blend to memory as the filtered target pixel value.

12. The method of claim 11, wherein computing the texture score further comprises:
computing an estimator of dispersion across all, or a subset, of the pixel values within the neighborhood; and
normalizing the dispersion estimator by signal intensity.

13. An image processing system, comprising:
an input device to receive input pixel values for a target pixel and a plurality of pixels within a spatial neighborhood of the target pixel;
a denoising module, comprising logic circuitry, coupled to the input device, and further including:
a texture processing module comprising logic circuitry to compute a texture score indicative of a level of texture detected within the neighborhood based on the input pixel values;
a NLM module comprising logic circuitry to compute a non-local mean of the target input pixel based on the input pixel values; and
a blending module comprising logic circuitry to modulate a weighting of the non-local mean relative to the target input pixel value inversely with the level of texture by computing a filtered target pixel value that is a blend of the non-local mean and the target input pixel value based on the texture score; and
an output device coupled to the denoising module to transmit the filtered target pixel value to an electronic memory.

14. The image processing system of claim 13, wherein:
the NLM module further comprises logic circuitry to compute a patch weight for candidate patches within the neighborhood by performing a comparison between a number of candidate patches and a target patch of pixels within the neighborhood that contains the target pixel;
the blending module further comprises logic circuitry to:
compute a blending coefficient based on the patch weights and the texture score; and
blend the non-local mean with the target input pixel value by an interpolation between the non-local mean and the target input pixel based on the blending coefficient.

15. The image processing system of claim 14, wherein:
the texture processing module further comprises logic circuitry to:
select a set of greatest patch weights based on the texture score; and
compute a blending coefficient based on a patch weight statistic indicative of the central tendency of the selected set of patch weights; and
the blending module further comprises logic circuitry to take a weighted sum of the non-local mean and the target input pixel, the non-local mean and target input pixel weighted complementarily by the patch weight statistic.

16. The image processing system of claim 15, wherein the texture processing module further comprises logic circuitry to determine an integer number of the candidate patches to represent in the set of weights with at least one of:
logic circuitry to evaluate a monotonically decreasing closed form function of the texture score ranging between the number of candidate patches and a non-zero minimum; or
logic circuitry to access a lookup table (LUT) using the texture score as an index value, the LUT associating different numbers of candidate patches with different texture scores.

17. The image processing system of claim 13, wherein:
the texture processing module further comprises logic circuitry to select a set of the largest patch weights based on the texture score; and the blending module further comprises logic circuitry to compute the blending coefficient based on the patch weights and the texture score that further comprises:
logic circuitry to compute an initial blending coefficient from a patch weight statistic indicative of the central tendency of the selected set of patch weights; and
logic circuitry to compute the blending coefficient through a mapping of the initial blending coefficient, wherein the mapping is a function of the texture score.

18. The image processing system of claim 13, wherein the blending module further comprises logic circuitry to compute the final blending coefficient with at least one of:
logic circuitry to evaluate a monotonically decreasing closed form function of the texture score; or
logic circuitry to access a lookup table (LUT) using the texture score as an index value, the LUT associating different texture scores with different mappings between initial and final blending coefficients.

19. The image processing system of claim 13, wherein the NLM module further comprises logic circuitry to:
select a subset of candidate patches within the neighborhood based on the texture score to include fewer candidate patches in response to detecting a greater level of texture; and
compute a non-local mean of the target input pixel from an average patch determined by averaging the subset of candidate patches as weighted by their corresponding patch weight.

20. A mobile computing platform, comprising:
the image processing system of claim 13;
a camera hardware module (CM) coupled to the input to generate raw image data in an RGB space that includes the input pixel values; and
at least one of the electronic memory, an encoder or display coupled to the output, the memory to store the filtered image pixel as a filtered representation of the image data, the encoder to encode the filtered image pixel as a filtered representation of the image data, and the display to present the filtered image pixel as a filtered representation of the image data.

21. One or more non-transitory computer-readable storage media, with instructions stored thereon, which when executed by a processor, cause the processor to perform a method comprising:
receiving input pixel values for a target pixel and a plurality of pixels within a spatial neighborhood of the target pixel;
computing a texture score indicative of a level of texture within the neighborhood based on the input pixel values;
computing a non-local mean of the target input pixel based on the input pixel values;
modulating a weighting of the non-local mean relative to the target input pixel value inversely with the level of texture by computing a filtered target pixel value that is a blend of the non-local mean and the target input pixel value based on the texture score; and
storing the filtered target pixel value to an electronic memory.

22. The media of claim 21, further comprising instructions stored thereon, which when executed by the processor, further cause the processor to perform the method further comprising:
determining a number of candidate patches within the neighborhood from which the non-local mean is computed based on the texture score to include fewer candidate patches in response to detecting a greater level of texture.

23. The media of claim 22, further comprising instructions stored thereon, which when executed by the processor, further cause the processor to perform the method further comprising:
computing a similarity score for candidate patches within the neighborhood by performing a comparison between a number of candidate patches and a target patch of pixels within the neighborhood that contains the target pixel;
computing a blending coefficient based on the similarity score and the texture score; and
blending the non-local mean with the target input pixel value by interpolating between the non-local mean and the target input pixel based on the blending coefficient.

* * * * *